(12) United States Patent
Koeske et al.

(10) Patent No.: US 9,156,326 B2
(45) Date of Patent: Oct. 13, 2015

(54) GAS SPRING PISTON AS WELL AS GAS SPRING ASSEMBLY, SUSPENSION SYSTEM, KIT AND METHOD INCLUDING SAME

(75) Inventors: Paul P. Koeske, Fishers, IN (US); Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/982,118

(22) PCT Filed: Jan. 26, 2012

(86) PCT No.: PCT/US2012/022730
§ 371 (c)(1),
(2), (4) Date: Jul. 26, 2013

(87) PCT Pub. No.: WO2012/103339
PCT Pub. Date: Aug. 2, 2012

(65) Prior Publication Data
US 2013/0300041 A1    Nov. 14, 2013

Related U.S. Application Data

(60) Provisional application No. 61/436,284, filed on Jan. 26, 2011.

(51) Int. Cl.
*B60G 11/28* (2006.01)
*F16F 9/04* (2006.01)
(Continued)

(52) U.S. Cl.
CPC ............... *B60G 11/28* (2013.01); *B60G 11/27* (2013.01); *F16F 9/0454* (2013.01); *F16F 9/057* (2013.01); *F16F 9/3214* (2013.01); *B60G 2202/152* (2013.01); *B60G 2206/424* (2013.01);
(Continued)

(58) Field of Classification Search
CPC .. B60G 11/28; B60G 11/27; B60G 2206/424; F16F 9/057; F16F 9/0454
USPC .......................... 267/64.23, 64.27, 124, 122; 280/124.157
See application file for complete search history.

(56) References Cited

U.S. PATENT DOCUMENTS 4,787,606 A * 11/1988 Geno et al. ................. 267/64.27
5,326,082 A    7/1994 Ecktman et al.
(Continued)

FOREIGN PATENT DOCUMENTS

DE    75 08 543 U    9/1975
DE    89 10 807 U1    1/1991
EP    0 953 787 A2    11/1999

OTHER PUBLICATIONS

Anonymous, "Snap Fit Theory", DSM Engineering Plastics—Technical Guide, Feb. 23, 2005, pp. 1-7.
International Search Report.

*Primary Examiner* — Thomas Irvin
(74) *Attorney, Agent, or Firm* — Jason A. Houser; Fay Sharpe LLP (57) ABSTRACT

A gas spring piston (3) includes an external retention feature (254) that is capable of receivably engaging and retention on an associated structural component (1cs). The gas spring piston (204) includes an outer side wall (228), a base wall dimensioned to abuttingly engage the associated structural component (1cs), and at least one external retention feature (254) disposed along the base wall (228). A gas spring assembly (200), a suspension system, a gas spring piston kit, and a method are also included.

20 Claims, 6 Drawing Sheets

(51) Int. Cl.
*F16F 9/05* (2006.01)
*B60G 11/27* (2006.01)
*F16F 9/32* (2006.01)
*F16B 21/06* (2006.01)
*F16B 21/07* (2006.01)

(52) U.S. Cl.
CPC ... *B60G2206/82092* (2013.01); *B60G 2206/91* (2013.01); *F16B 21/065* (2013.01); *F16B 21/071* (2013.01); *Y10T 29/49826* (2015.01)

(56) References Cited

U.S. PATENT DOCUMENTS

| | | | | |
|---|---|---|---|---|
| 5,382,006 | A | * | 1/1995 | Arnold ................. 267/64.27 |
| 6,386,524 | B1 | * | 5/2002 | Levy et al. ............ 267/64.27 |
| 6,679,485 | B2 | * | 1/2004 | DeLizo et al. ......... 267/64.19 |
| 8,231,113 | B2 | * | 7/2012 | Grabarz et al. ........ 267/64.27 |
| 8,439,378 | B2 | * | 5/2013 | Phillips et al. ........ 280/124.116 |
| 2006/0055094 | A1 | | 3/2006 | Attinello et al. |
| 2013/0264790 | A1 | * | 10/2013 | Leonard ............. 280/124.157 |

* cited by examiner

GAS SPRING PISTON AS WELL AS GAS SPRING ASSEMBLY, SUSPENSION SYSTEM, KIT AND METHOD INCLUDING SAME

BACKGROUND

The subject matter of the present disclosure broadly relates to the art of gas spring devices and, more particularly, to a gas spring piston that includes an external retention feature capable of receivably engaging and retention on an associated structural component without the use of threaded fasteners or other components that would otherwise extend through the associated structural component. A gas spring assembly and a kit including such a gas spring piston are also disclosed. Additionally, a suspension system including a plurality of gas spring assemblies and a method of installing a gas spring piston are included.

The subject matter of the present disclosure may find particular application and use in conjunction with suspension systems of wheeled vehicles, and may be described herein with specific reference thereto. However, it is to be appreciated that the subject matter of the present disclosure is also amenable to use in a wide variety of other applications and environments, and that the specific uses shown and described herein are merely exemplary. For example, the subject matter of the present disclosure could be used in connection with gas springs associated with support structures, height adjusting systems and/or actuators associated with industrial machinery, components thereof and/or other such equipment.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

During travel in the opposing direction (i.e., during rebound motion), it is common for the suspension system of vehicles to be adapted and/or otherwise arranged such that there are few operating conditions, during normal usage, under which the plurality of spring devices would be tensioned or otherwise undergo a tension load. Nonetheless, conventional gas spring assemblies are often secured on or along associated structural components using threaded fasteners and other similar securement devices that pass through a hole or opening in the associated structural component to secure an end member of the gas spring assembly thereon. In this manner, the end member of the gas spring assembly is fixedly secured to the associated structural component.

Of course, wheeled motor vehicles travel over roadways during a wide variety of environmental conditions and are subjected to many different substances (e.g., water, salt, dirt). Naturally, components of wheeled motor vehicles occasionally require repair or replacement. In other cases, such components may need to be removed to permit repair or replacement of another, different component and/or system. In either case, threaded fasteners can be difficult to remove after enduring years of such harsh environmental conditions and exposure to extreme temperatures as well as water, salt, dirt and/or other substances. Such difficulty can contribute to increased maintenance and repair costs as well as increased time and effort spent in disassembling vehicle components.

Accordingly, it is believed desirable to develop a gas spring piston that includes external retention features, as well as a gas spring assembly and suspension system including the same, that may be capable of overcoming the foregoing and/or other disadvantages.

BRIEF SUMMARY

One example of a gas spring piston in accordance with the subject matter of the present disclosure and dimensioned for securement on an associated structural component can include a piston body having a longitudinal axis. The piston body can include a base wall dimensioned to abuttingly engage the associated structural member. A first retention member can project axially outwardly beyond the base wall. A second retention member can project axially beyond the base wall and can be disposed in laterally spaced relation to the first retention member. The first and second retention members can include a fixed end disposed in a direction toward the base wall and a free end disposed in a direction away from the base wall relative to the fixed end. The free end of the first and second retention members can be capable of resilient deflection such that the associated structural member can be received therebetween.

One example of a gas spring assembly in accordance with the subject matter of the present disclosure can include a flexible wall that extends peripherally around a longitudinal axis between a first end and a second end that is spaced longitudinally from the first end. An end member can be secured across the first end of the flexible wall such that a substantially fluid-tight seal is formed therewith. A gas spring piston, such as has been set forth in the foregoing paragraph and/or is otherwise described herein, can be operatively connected to the second end of the flexible wall such that a substantially fluid-tight seal is formed therewith and such that the flexible wall is capable of forming a rolling lobe along at least a portion of the piston body.

One example of a suspension system in accordance with the subject matter of the present disclosure can include a structural member and a gas spring assembly, such as has been set forth in the foregoing paragraph and/or is otherwise described herein. The gas spring assembly can be operatively axially-retained on the structural member using at least the first and second retention members and without the use of an associated axial-retention component extending through an associated passage in the structural member.

One example of a kit in accordance with the subject matter of the present disclosure can include a gas spring piston, such as has been set forth in any one of the foregoing three paragraphs and/or is otherwise described herein, and at least one retention block dimensioned to abuttingly engage one of the first and second retention members and thereby inhibit resilient deflection thereof.

One example of a method of installation in accordance with the subject matter of the present disclosure can include an action of providing a structural component. The method can also include an action of providing a gas spring piston, such as has been set forth in any one of the foregoing four paragraphs and/or is otherwise described herein. The method can further include an action of positioning the gas spring piston along the structural component, such as by deflecting the first and second retention members in a direction away from one another while axially displacing the gas spring piston until the base wall is in abutting engagement with the structural component and until the first and second retention members deflect in a direction toward one another and abuttingly engage the structural component. The method can also include an action of positioning at least one retention block in abutting engagement with one of the first and second retention members to thereby inhibit deflection thereof in a direction away from the other one of the first and second retention members.

DETAILED DESCRIPTION

Figure 1:
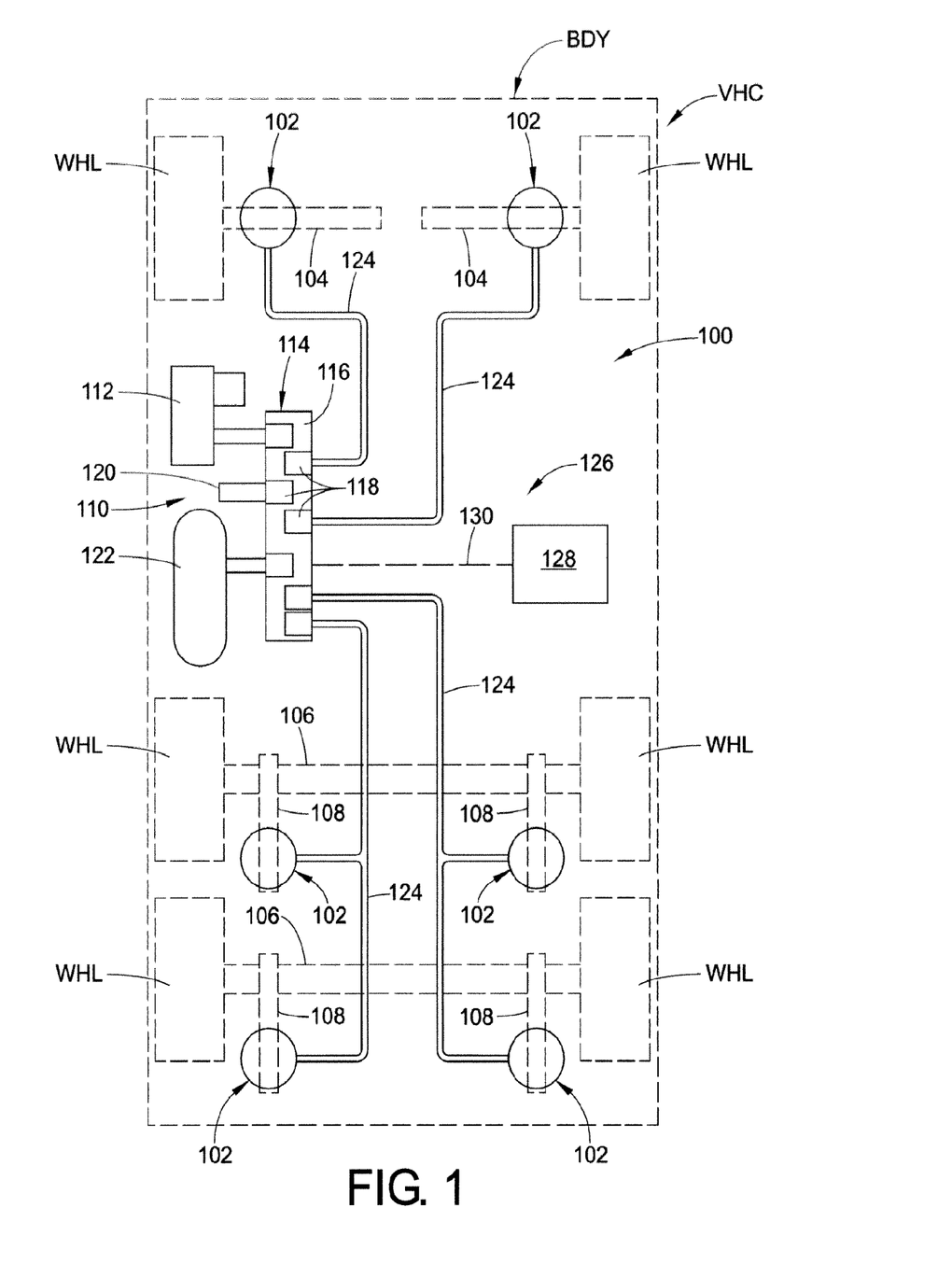
FIG. 1 is a schematic representation of one example of a vehicle including a suspension system and gas spring assemblies in accordance with the subject matter of the present disclosure.

Turning now to the drawings, wherein the showings are for the purpose of illustrating examples of the subject matter of the present disclosure and which are not intended as a limitation of the same, FIG. 1 illustrates one example of a suspension system 100 disposed between a sprung mass, such as an associated vehicle body BOY, for example, and an unsprung mass, such as an associated wheel WHL or an associated wheel-engaging member or axle, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies, one or more of which is disposed toward each corner of the associated vehicle adjacent a corresponding wheel WHL thereof. It will be appreciated, however, that any other suitable number of gas spring assemblies could alternately be used and/or that such gas spring assemblies can be disposed in any other suitable configuration and/or arrangement. In the exemplary arrangement schematically represented in FIG. 1, a plurality of gas spring assemblies 102 are operatively connected between the sprung and unsprung masses of the vehicle with two of gas spring assemblies 102 operatively associated with front wheel-engaging members 104 of vehicle VHC and the remaining gas spring assemblies operatively associated with rear wheel-engaging members 106 of vehicle VHC. In particular, rear wheel-engaging members 106 are shown as including trailing arms 108 operatively connected thereto with gas spring assemblies 102 operatively disposed between a trailing arm and the sprung mass (e.g., body BOY) of the vehicle. It will be appreciated, however, that other suitable arrangements and/or configurations could alternately be used.

Suspension system 100 can also optionally include a pressurized gas system 110 that is operatively associated with the gas spring assemblies for selectively supplying pressurized gas (e.g., air) thereto and selectively transferring pressurized gas therefrom. In the exemplary embodiment shown in FIG. 1, pressurized gas system 110 includes a pressurized gas source, such as a compressor 112, for example, for generating pressurized air or other gases. The pressurized gas system can also include any number of one or more control devices of any suitable type, kind and/or construction that may be capable of affecting the selective transfer of pressurized gas. For example, a valve assembly 114 is shown as being in communication with compressor 112 and can be of any suitable configuration or arrangement. In the exemplary embodiment shown, valve assembly 114 includes a valve block 116 with a plurality of valves 118 supported thereon. Valve assembly 114 can also optionally include a suitable exhaust, such as a muffler 120, for example, for venting pressurized gas from the system. Optionally, pressurized gas system 110 can also include a reservoir 122 in fluid communication with valve assembly 114 and suitable for storing pressurized gas.

The one or more control devices, such as valve assembly 114, for example, can be in communication with gas spring assemblies 102 in any suitable manner, such as, for example, through suitable gas transfer lines 124. As such, pressurized gas can be selectively transmitted to and/or from the gas springs through valve assembly 114, such as to alter or maintain vehicle height at one or more corners of the vehicle, for example.

Suspension system 100 also includes a control system 126 that is capable of communication with any one or more other systems and/or components (not shown) of suspension system 100 and/or of vehicle VHC, and is capable of selective operation and/or operative communication of at least one component of the suspension system. Control system 126 includes a controller or electronic control unit (ECU) 128 in communication with compressor 112 and/or valve assembly 114, such as through a suitable conductor or lead 130, for example, for selective operation and control thereof, including supplying and exhausting pressurized gas to and from any number of one or more gas spring assemblies, such as gas spring assemblies 102, for example. Additionally, it will be appreciated that controller 128 can be of any suitable type, kind and/or configuration.

Control system 126 can also optionally include one or more height or distance sensing devices (not shown) as well as any other desired systems and/or components. Such height sensors, if provided, are preferably capable of generating or otherwise outputting a signal (e.g., an electrical signal and/or digital data) having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may respectively operate using ultrasonic or electromagnetic waves, for example.

Having described an example of a suspension system (e.g., suspension system 100) that can include a gas spring assembly in accordance with the subject matter of the present disclosure, one example of such a gas spring assembly will now be described in connection with FIGS. 2 and 3. As shown therein, a gas spring assembly 200, such as may be suitable for use as a gas spring assembly 102 in FIG. 1, for example, is shown as including an end member, such as top or bead plate 202, for example, and an end member, such as gas spring piston 204, for example, that is spaced from the other end member such that a longitudinal axis AX is at least partially formed therebetween. A flexible wall, such as a flexible sleeve 206, for example, is secured between the end members (e.g., bead plate 202 and piston 204) and at least partially forms a spring chamber 208 therebetween. The flexible wall (e.g., flexible sleeve 206) extends peripherally about axis AX and longitudinally between opposing ends. In some cases, the flexible wall can include a mounting bead 210 formed along one end and a mounting bead 212 formed along the opposing end of the flexible wall.

Mounting bead 210 is shown as being captured by the peripheral edge (not numbered) of bead plate 202. It will be appreciated that the peripheral edge can be deformed around the mounting bead in any manner suitable for forming a substantially fluid-tight seal therewith.

Additionally, one or more securement devices, such as mounting studs 214, for example, can be included along bead plate 202. In the exemplary embodiment shown in FIGS. 2 and 3, mounting studs 214 project outwardly from the bead plate 202 and are secured thereon in a suitable manner, such as, for example, by way of a flowed-material joint (not shown) or a press-fit connection. Such one or more securement devices may be suitable for securing the bead plate 202 on an associated structural member, such as by extending through mounting holes HLS in an upper structural component USC of a vehicle and receiving one or more threaded nuts or other securement devices (not shown), for example. A fluid communication port, such as a fluid passage 216, for example, can optionally be provided to permit fluid communication with a spring chamber 208. In the exemplary embodiment shown, fluid passage 216 extends through at least one of studs 214 and is in fluid communication with spring chamber 208. However, it will be appreciated that any other suitable fluid communication arrangement could alternately be used.

Figure 2:
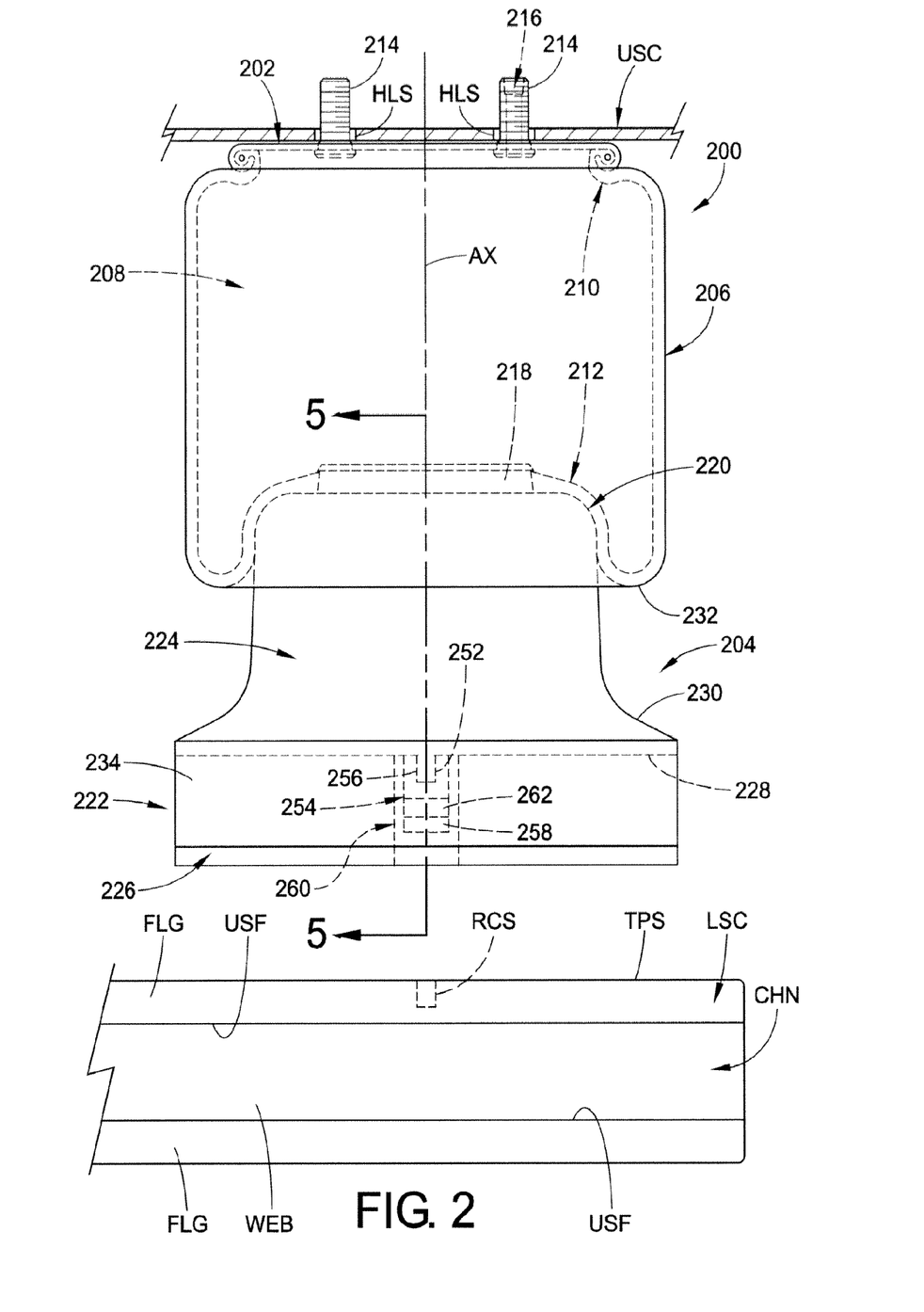
FIG. 2 is a side view of one example of a gas spring assembly in accordance with the subject matter of the present disclosure prior to assembly on an associated structural component.
Figure 3:
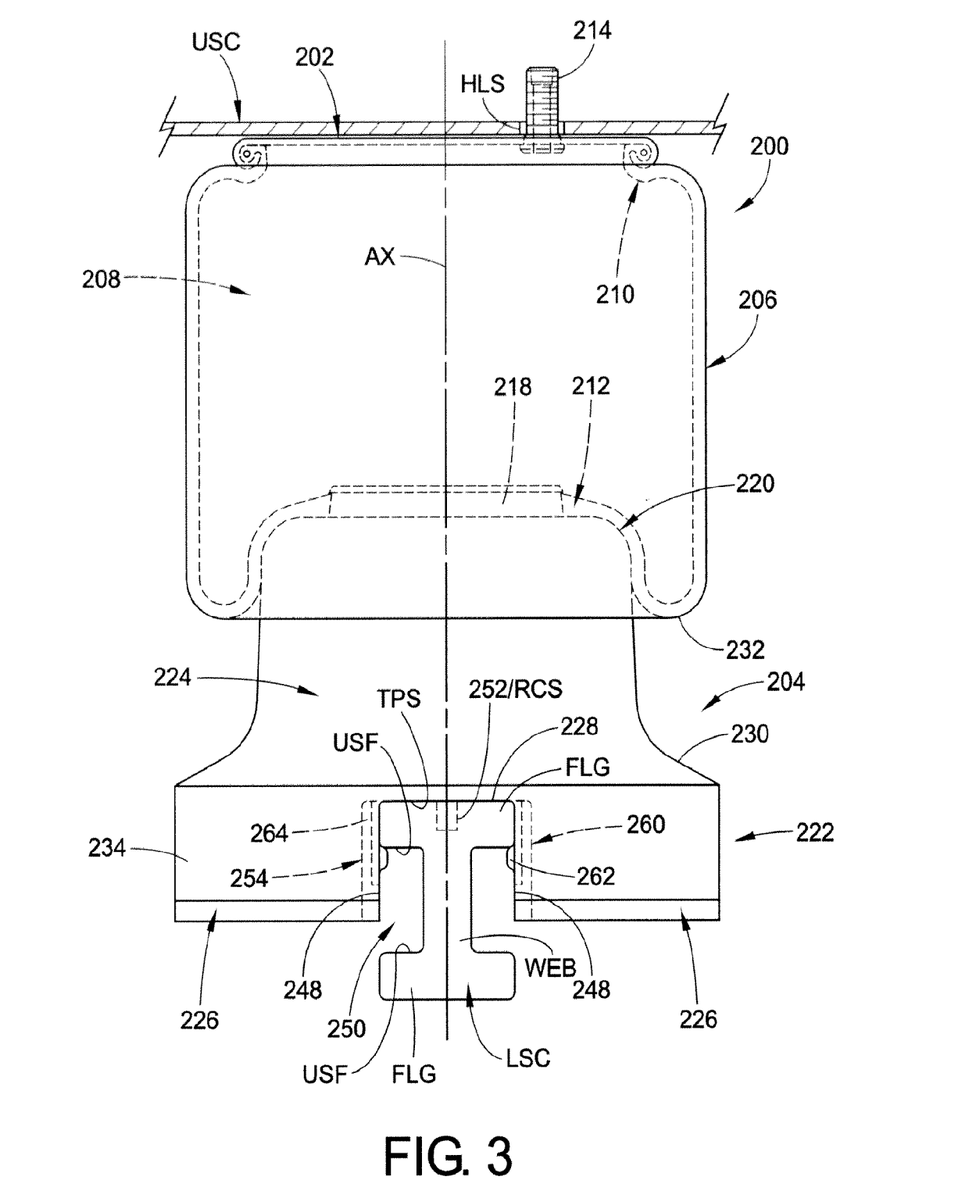
FIG. 3 is an end view of the exemplary gas spring assembly in FIG. 2 shown assembled on the associated structural component.

Although not illustrated in FIGS. 2 and 3, mounting bead 212 of the flexible wall could be captured between an end closure and the piston assembly in a conventional manner, and the end closure could be secured on the piston assembly using a suitable securement device or assembly, such as a mounting stud and nut, for example. Alternately, piston 204 can include a bead mounting wall 218 that is adapted to receive and retain mounting bead 212, such as is shown in FIGS. 2 and 3, for example.

With reference, now, to FIGS. 2-5, gas spring piston 204 is shown as extending generally longitudinally between opposing ends 220 and 222, and including a piston body 224 as well as optional piston covers 226 that are shown as being secured on the piston body along end 222 thereof. It will be appreciated that gas spring pistons of a wide variety of shape, sizes and configurations have been developed and that the specific configuration illustrated herein is merely exemplary. In the exemplary arrangement shown in FIGS. 2-5, gas spring piston 204 includes a bottom or base wall 228 that is dimensioned to abuttingly engage a side or surface of an associate structural member, such top surface TPS of a lower structural component LSC, for example.

Gas spring piston 204 is also shown as including a first or outer side wall 230 that extends generally longitudinally between ends 220 and 222. In use as a component of gas spring assembly 200, a portion of flexible sleeve 206 forms a rolling-lobe 232 that is displaced along outer side wall 230 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring pistons. As such, it will be appreciated that the profile of first side wall 230 is merely exemplary.

Gas spring piston 204 can also, optionally, include a second or outer side wall 234 that extends longitudinally from along side wall 230 toward piston covers 226. It will be appreciated that outer side wall 234 can be of any suitable size, shape and/or configuration, and that the arrangement shown in FIGS. 2-5 is merely exemplary. That is, outer side wall 234 is shown as being substantially cylindrical. However, a configuration that is at least partially cylindrical, at least partially frustoconical, at least partially linear, at least partially curvilinear and/or any combination thereof could alternately be used. As shown in FIG. 5, gas spring piston 204 can also, optionally, include a third or inner side wall 236 that at least partially defines a piston cavity 238 having an opening 240 along end 220 such that the piston cavity can fluidically communicate with an associated spring chamber, such as spring chamber 208, for example. Side wall 236 is shown as extending generally longitudinally between an end portion 242 of outer side wall 230 and base wall 228. It will be appreciated, however, that other arrangements could alternately be used.

Additionally, side wall 236 is shown as being spaced radially inwardly from side walls 230 and 234 such that an inner chamber 244 (FIG. 5) is at least partially defined therebetween. Gas spring piston 204 can optionally include one or more connector walls 246 (FIG. 5) that extend between and/or otherwise operatively interconnect side walls 230, 234 and/or 236. Such one or more connector walls 246, if provided, can separate or otherwise divide inner chamber 244 into a plurality of chamber portions (not shown). For example, a plurality of connector walls 246 could be spaced apart from one another around or about longitudinal axis AX and extend radially outwardly from side wall 236 to side walls 230 and/or 234 such that a plurality of chamber portions are disposed circumferentially about the longitudinal axis. Regardless of the configuration of inner chamber 244, the inner chamber or the chamber portions thereof can be open along end 222 of the piston body, such as may be useful for manufacturing or other purposes. In such case, optional piston covers 226 can be used to at least partially cover the open end(s) of the inner chamber or inner chamber portions. For example, in the arrangement shown, the piston covers are used to substantially encapsulate or otherwise fully cover the inner chamber, such as by securing the piston covers on or along the piston body in a suitable manner (e.g., welding and/or using threaded fasteners).

Gas spring assembly 200 is illustrated as including gas spring piston 204 that has at least a portion of piston body 224 that extends or is otherwise disposed below the mounting surface of the gas spring piston (e.g., base wall 228 of gas spring piston 204). For example, FIGS. 2-5 illustrate gas spring piston 204 as including a pair of opposing and laterally spaced-apart inboard side walls 248 that extend longitudinally outwardly from along base wall 228 in a direction opposite end 220. Side walls 248 at least partially define a channel or passage 250 along at least a portion of the gas spring piston that is dimensioned to receive and/or engage at least a portion of an associated structural member, such as lower structural component LSC, for example.

As indicated above, channel 250 is preferably dimensioned to receivingly engage an associated structural component (e.g., trailing arm 108 in FIG. 1), such as is represented in FIGS. 2-5 by lower structural component LSC, for example. It will be appreciated, however, that the associated structural component can be of any suitable size, shape, form, configuration and/or construction. As such, it is to be understood that the shape and configuration of lower structural component LSC, which is described herein in connection with FIGS. 2-5 is merely one example of a suitable construction and that other arrangements could alternately be used without departing from the subject matter of the present disclosure. As illustrated in FIGS. 2 and 3, lower structural component LSC has the shape of an I-beam in which flanges FLG are spaced apart from one another with a web WEB extending therebetween. In addition to top surface TPS, undersurfaces USF of the upper and lower flanges are identified in FIGS. 2 and 3. As is typical with I-beam constructions flanges FLG are shown as being of a greater width than web WEB. As a result, undersurfaces USF extend inwardly between the outer sides or extents (not identified) of flanges FLG and the side surfaces (not identified) of web WEB such that channels CHN (FIG. 2) extend lengthwise along the associated structural component (e.g., lower structural component LSC).

Gas spring piston 204 of gas spring assembly 200 also includes one or more securement features dimensioned, configured and/or otherwise adapted to operatively interengage an associated structural feature and at least assist in retaining the gas spring piston thereon. In a preferred arrangement, these one or more features (either alone or in combination with one another) will substantially retain the gas spring piston in a fixed position on or along the associated structural component (e.g., lower structural component LSC) without the use of other components that extend through the associated structural component, such as a threaded fastener extending through a hole in the lower structural component, for example.

As one example, the gas spring piston could optionally include a lateral positioning feature that is adapted to operatively interengage the associated structural member and maintain the gas spring piston in the desired position thereon. In the arrangement shown in FIGS. 2-5, gas spring piston 204 includes a post 252 that projects outwardly from along base wall 228 in a direction into channel 250. Lower structural component LSC is shown as including a feature, such as a recess RCS, for example, that is dimensioned to receivingly engage the lateral positioning feature (e.g., post 252). Among other possible functions, it will be appreciated that the interengagement of post 252 with recess RCS will permit the gas spring piston to be retained in a desired position lengthwise along lower structural component LSC. In a preferred arrangement, a lateral positioning feature, such as recess RCS, for example, will extend into but not through the associated structural component (e.g., lower structural component LSC).

Gas spring piston 204 can also include one or more retention tabs or fingers that are adapted to operatively interengage the associated structural member (e.g., lower structural component LSC, front wheel-engaging member 104 and/or trailing arm 108) and resist relative displacement between the gas spring piston and the associated structural member in the longitudinal direction (i.e., in a direction approximately aligned with longitudinal axis AX). In the exemplary arrangement in FIGS. 2-5, two retention tabs 254 are shown in spaced-apart relation to one another along opposing sides of channel 250 adjacent inboard side walls 248. Tabs 254 include a fixed end 256 secured to the piston body, such as along base wall 228, for example, and a free end 258 that is disposed in spaced relation to the fixed end and is capable of resilient deflection. In this manner, the free end of the tabs can be biased or otherwise deflected outwardly to permit passage of the associated structural member. Once the associated structural member has been received, the free end is permitted to return to an original or unbiased position that results in interengagement between the tabs and the associated structural member.

Figure 4:
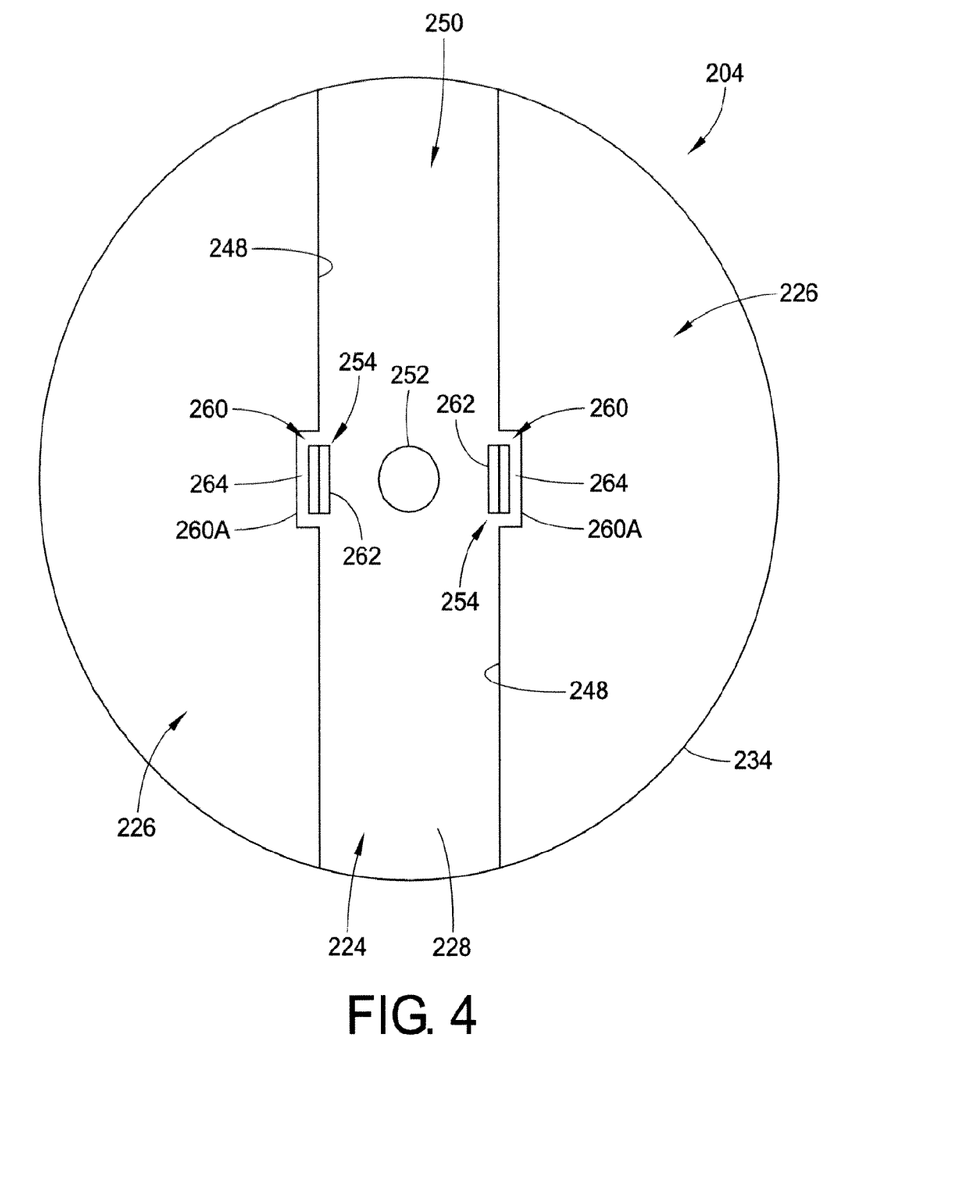
FIG. 4 is a bottom plan view of the exemplary gas spring piston shown in FIGS. 2 and 3.
Figure 5:
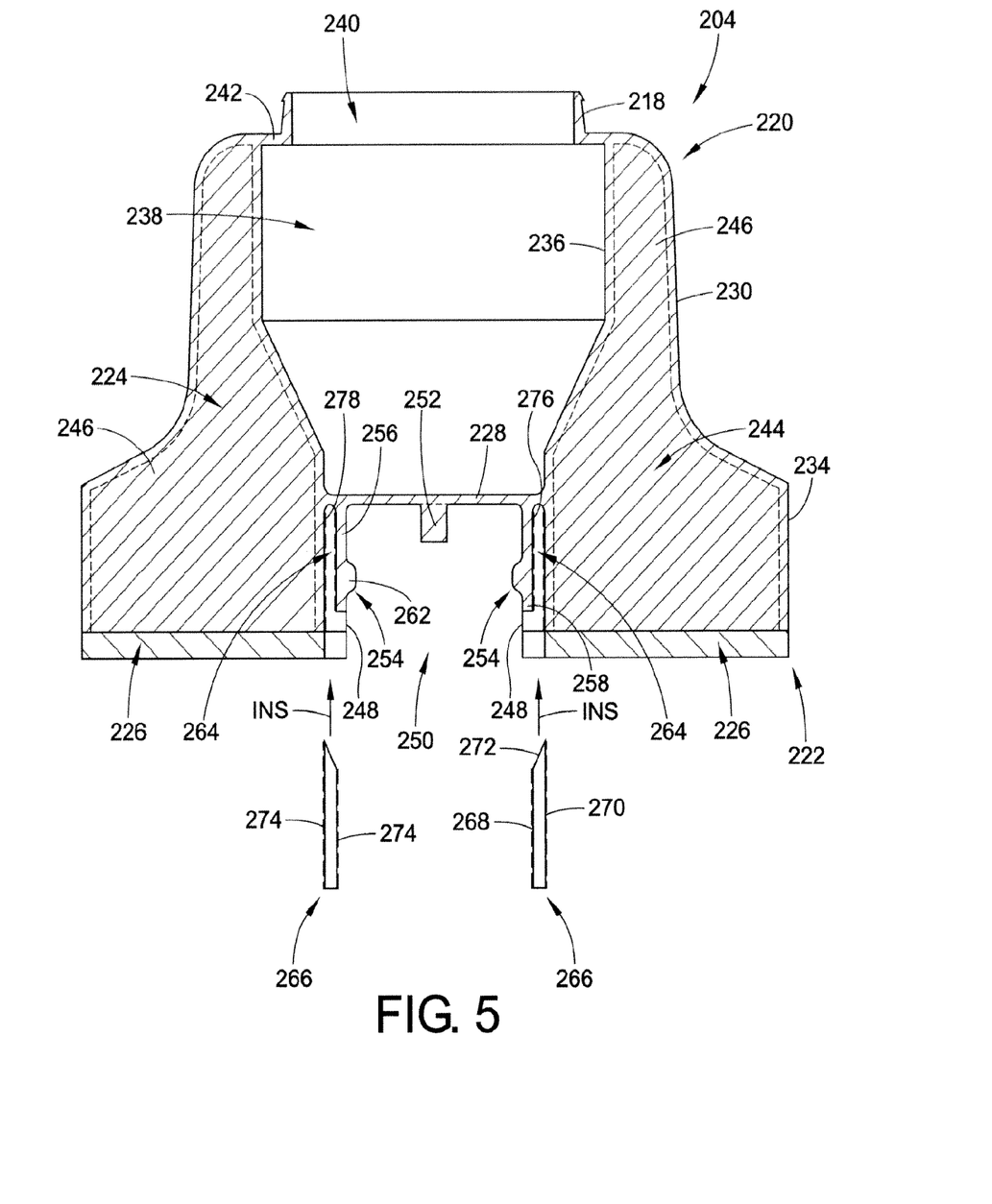
FIG. 5 is a cross-sectional side view of the exemplary gas spring piston shown in FIGS. 2-4 taken from along line 5-5 in FIG. 2.

In a preferred arrangement, retention tabs 254 are at least approximately aligned with inboard side walls 248, such as is illustrated in FIGS. 3-5, for example. In such case, inboard side walls 248 can optionally include one or more recess walls 260A that at least partially define a corresponding one of recesses 260 (FIG. 4), such as may be dimensioned to at least partially receive tabs 254. Additionally, tabs 254 can include projections 262 that extend inwardly from along the free ends of the retention tabs. In this manner, operative interengagement can be achieved with the associated structural member while permitting the retention tabs to remain approximately aligned with the inboard side walls. To permit free ends to deflect outwardly and thereby receivingly engage the associated structural member, recesses 260 can be dimensioned or otherwise configured such that cavities 264 are formed between the inboard side walls and the retention tabs.

Once the associated structural member (e.g., lower structural component LSC) is received within channel 250 and operatively interengaged by retention tabs 254, retainment blocks 266 (FIG. 5) can optionally be inserted or otherwise positioned at least partially within cavities 264, as is represented in FIG. 5 by arrows INS, such as to prevent outward deflection of at least the free ends of the retention tabs. Retainment blocks 266, if provided, can be of any suitable size, shape, form, configuration and/or arrangement. As one example, retainment blocks 266 can include opposing side surfaces 268 and 270 as well as a tapered end wall 272, such as may be suitable for entering into cavities 264, for example, and thereby increasing the ease with which the retainment blocks can be inserted into the corresponding cavities (e.g., cavities 264).

Retainment blocks 266 can also, optionally, include any number or one or more suitable features for operatively interengaging retention tab 254 and/or inboard side wall 248 to thereby inhibit egress of the retention blocks from the cavities. As one example, one or more ridges, serrations, grooves or other surface features could be included on or along one or more surfaces of retainment blocks 266 and/or one or more surfaces of tabs 254 and/or inboard side walls 248, as are represented in FIG. 5 by dashed lines 274, 276 and 278, respectively. Additionally, or in the alternative, a suitable flowed-material joint (e.g., adhesive or weld joint) could be used to assist in retaining one or more of the retainment blocks within a corresponding one of the cavities.

Projections 262, if provided, can be of any size, shape, quantity, configuration and/or arrangement that may be suitable for operatively interengaging the associated structural member. For example, the associated structural member could include corresponding or matching features for receiving the projections of the retention tabs. Alternately, the projections could be configured to operatively interengage a conventional feature of the associated structural member. In the exemplary arrangement shown, projections 262 abuttingly engage at least a portion of undersurface USF of the upper flange of lower structural component LSC. In this manner, the gas spring piston is snap fit over and locked onto the lower structural component in a manner that can substantially inhibit axial movement of the gas spring piston and the associated structural component relative to one another.

Figure 6:
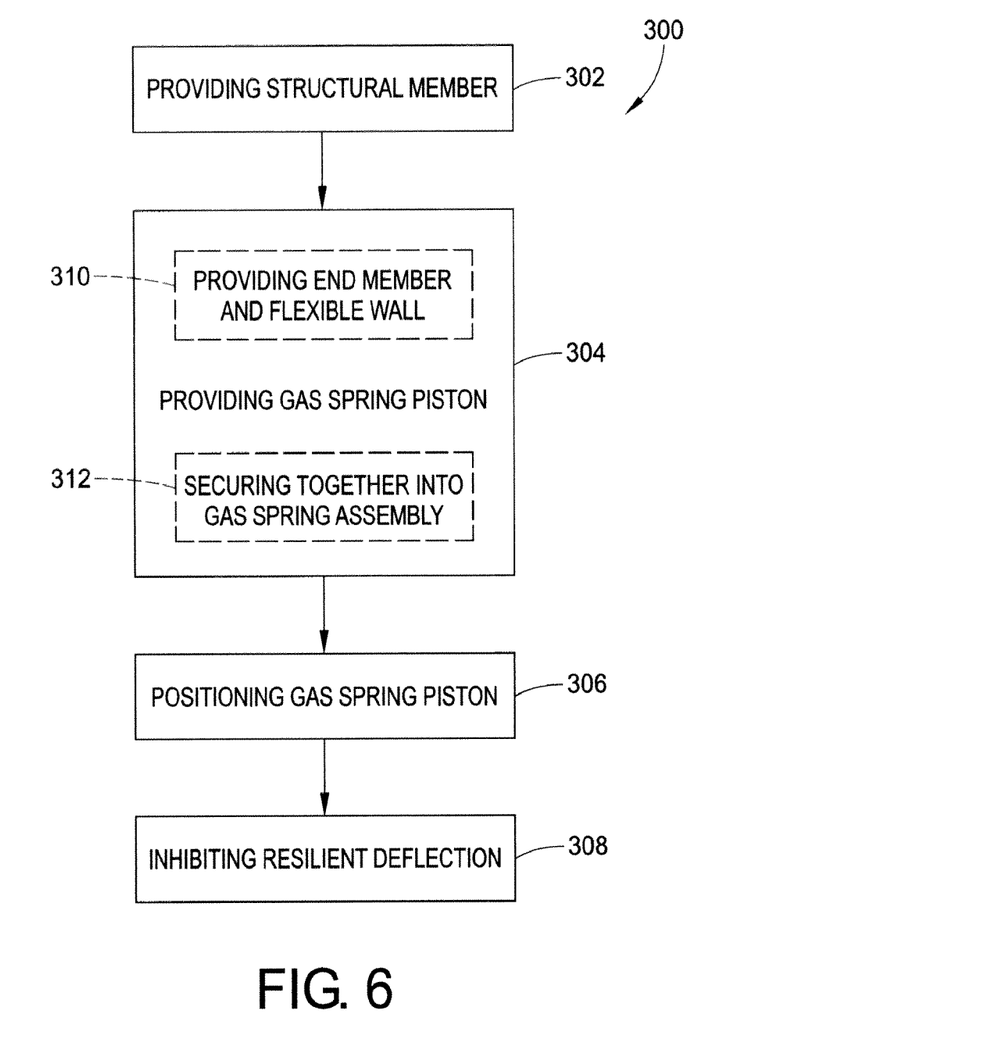
FIG. 6 is a graphical representation of one example of a method of installing a gas spring piston in accordance with the subject matter of the present disclosure.

One example of a method 300 of installing a gas spring piston in accordance with the subject matter of the present disclosure, such as gas spring piston 204, for example, is shown in FIG. 6 as including an action of providing a structural member having at least one mounting surface (e.g., lower structural component LSC), as is represented by item number 302 in FIG. 6. Method 300 also includes providing a gas spring piston (e.g., gas spring piston 204) including one or more external features dimensioned to receivably engage the structural component for retention thereon without the use of components that extend through the structural member. In some cases, the action of providing a gas spring piston can include providing a gas spring piston that includes a pair of spaced-apart retention members (e.g., retention tabs 254) that are capable of resilient deflection such that the structural member can be received therebetween, as is represented by item number 304 in FIG. 6.

Method 300 also includes an action of positioning the gas spring piston on or along the structural member such that the one or more external retention features receivingly engages and retains the gas spring piston on the structural member, such as is represented in FIG. 6 by item number 306. Method 300 can further include an action of inhibiting the resilient deflection of one or more of the retention members, such as may be useful for retaining the gas spring piston on the structural member. In some cases, the action of inhibiting the resilient deflection of the one or more retention members (e.g., retention tabs 254) can include inserting one or more retention blocks (e.g., retention blocks 266) between the retention member and an adjacent wall (e.g., inboard side walls 248), such as is represented in FIG. 6 by item number 308.

In some cases, the action of providing a gas spring piston identified by item number 304 can, optionally, include providing an end member (e.g., bead plate 202) and a flexible wall (e.g., flexible sleeve 206), as is represented by item number 310 in FIG. 6. The action of providing a gas spring piston identified by item number 304 can also, optionally, include securing the flexible wall between the end member and the gas spring piston to form a gas spring assembly (e.g., gas spring assembly 102 and/or 200), as is represented in FIG. 6 by item number 312.

It will be appreciated that the gas spring assemblies of the present disclosure can be operatively connected between the sprung and unsprung masses of an associated vehicle in any suitable manner. For example, as shown in FIG. 1, the gas spring assemblies can be operatively connected between wheel-engaging members and a body of a vehicle VHC. It will be appreciated, however, that the configuration of vehicle VHC in FIG. 1 is merely a schematic representation of the structural components of the sprung and unsprung masses of the vehicle. Thus, it will be understood that this schematic representation is provided for purposes of discussion and ease of understanding and is not intended to be in any way limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alteration.

The invention claimed is:

1. A gas spring piston dimensioned for securement along an associated structural member, said gas spring piston comprising:
a piston body having a longitudinal axis and including:
a base wall oriented transverse to said longitudinal axis, said base wall extending radially outward to an outer peripheral edge and including a base surface dimensioned to abuttingly engage the associated structural member;
a first retention member projecting axially outwardly beyond said base surface of said base wall;
a second retention member projecting axially beyond said base surface of said base wall and disposed in laterally spaced relation to said first retention member, said first and second retention members including a fixed end disposed in a direction toward said base wall and a free end disposed in a direction away from said base wall relative to said fixed end, said free end of said first and second retention members being capable of resilient deflection such that the associated structural member can be received therebetween; and,
first and second channel side walls extending in a first longitudinal direction from along said base wall, said first and second channel walls at least partially defining a channel dimensioned to receive the associated structural member, said channel extending lengthwise across said base wall in a direction transverse to said longitudinal axis, said channel including at least first and second open ends with said first open end oriented transverse to said longitudinal axis and disposed opposite said base wall of said piston body and said second open end being disposed along said outer peripheral edge of said base wall.

2. A gas spring piston according to claim 1, wherein said piston body includes an outer side wall extending peripherally about said longitudinal axis between a first end and a second end spaced longitudinally from said first end with said outer side wall projecting from along said base wall in a second longitudinal direction opposite said first longitudinal direction.

3. A gas spring piston according to claim 2, wherein said piston body includes an inner side wall spaced radially inwardly from said outer side wall, said inner side wall at least partially defining a piston cavity within said piston body.

4. A gas spring piston according to claim 3, wherein said inner side wall and said outer side wall at least partially define an inner chamber disposed therebetween and having an open end disposed toward said first longitudinal direction, said gas spring piston further comprising:
at least one cover wall extending across said open end and at least partially enclosing said inner chamber.

5. A gas spring piston according to claim 1, wherein said first inboard side wall is disposed in approximate alignment with said first retention member, and said second inboard side wall is disposed in approximate alignment with said second retention member.

6. A gas spring piston according to claim 1, wherein said first and second retention members each include a projection extending therefrom beyond a respective one of said first and second channel side walls and into said channel.

7. A gas spring piston according to claim 1, wherein said piston body includes a first recess wall at least partially defining a first recess extending laterally into said piston body from along said first inboard side wall adjacent said first retention member, and a second recess wall at least partially defining a second recess extending laterally into said piston body from along said second inboard side wall adjacent said second retention member.

8. A gas spring piston according to claim 7, wherein said piston body includes a first cavity disposed within said first recess between said first retention member and said first recess wall, and a second cavity disposed within said second recess between said second retention member and said second recess wall, said first and second cavities dimensioned to permit deflection of a free end of a respective one of said first and second retention members to laterally deflect in a direction away from one another.

9. A gas spring assembly comprising:
a flexible wall extending peripherally around a longitudinal axis between a first end and a second end spaced longitudinally from said first end;
an end member secured across said first end of said flexible wall such that a substantially fluid-tight seal is formed therewith; and,
a gas spring piston according to claim 1 operatively connected to said second end of said flexible wall such that a substantially fluid-tight seal is formed therewith and such that said flexible wall is capable of forming a rolling lobe along at least a portion of said piston body.

10. A suspension system comprising:
a structural member; and,
a gas spring assembly according to claim 9 with said gas spring piston of said gas spring assembly operatively axially-retained on said structural member using at least said first and second retention members and without the use of an associated axial-retention component extending through an associated passage in the structural member.

11. A suspension system according to claim 10, wherein said structural member includes a top surface and a recess extending into said structural member from along said top surface, and said piston body of said gas spring piston includes a projection extending axially-outwardly from along said base wall and dimensioned for receipt within said recess to position said gas spring piston along said structural member.

12. A suspension system according to claim 10, wherein said structural member has an elongated length and includes an undersurface extending in a lengthwise direction along at least a portion of said elongated length, and at least one of said first and second retention members includes a projection extending outwardly therefrom and into abutting engagement with said undersurface of said structural member.

13. A gas spring piston kit comprising:
a gas spring piston according to claim 1; and,
at least one retention block dimensioned to abuttingly engage one of said first and second retention members and thereby inhibit resilient deflection thereof.

14. A gas spring piston kit according to claim 13, wherein at least one of said first retention member, said second retention member and said at least one retention block includes a surface feature disposed along at least one surface thereof, said surface feature operative to inhibit relative movement with an abutting one of said first retention member, said second retention member and said at least one retention block.

15. A method of assembly comprising:
providing a structural component;
providing a gas spring piston according to claim 1;
positioning said gas spring piston along said structural component by deflecting said first and second retention members in a direction away from one another while axially displacing said gas spring piston until said base wall is in abutting engagement with said structural component and until said first and second retention members deflect in a direction toward one another and abuttingly engage said structural component; and,
positioning at least one retention block in abutting engagement with one of said first and second retention members to thereby inhibit deflection thereof in a direction away from another.

16. A gas spring end member assembly dimensioned for securement along an associated structural member having associated surfaces facing in opposing directions from one another, said gas spring end member assembly comprising:
a base wall portion oriented transverse to said longitudinal axis, said base wall portion extending radially outward to an outer peripheral edge and including a base surface dimensioned to abuttingly engage the associated structural member;
a first channel side wall portion extending in a first longitudinal direction from along said base wall portion to a first distal edge disposed in longitudinally-spaced relation to said base wall portion;
a second channel side wall portion extending in said first longitudinal direction from along said base wall portion to a second distal edge disposed in longitudinally-spaced relation to said base wall portion, said second channel side wall portion disposed in laterally spaced relation to said first channel side wall portion such that a channel dimensioned to receive the associated structural member is at least partially formed between said first and second channel side wall portions, said channel extending lengthwise across said base wall portion in a direction transverse to said longitudinal axis and including:
a first open end disposed along said outer peripheral edge;
a second open end disposed along said outer peripheral edge and in laterally-spaced relation to said first open end; and,
a third open end extending laterally across said gas spring end member between said first and second distal edges of said first and second channel side wall portions;
a first retention member disposed within said channel adjacent said first channel side wall portion, said first retention member extending axially outwardly beyond said base surface of said base wall portion and including:
a fixed end disposed in along said base wall portion;
a free end disposed in longitudinally-spaced relation to said base wall portion relative to said fixed end; and,
a projection extending from along said free end of said first retention member beyond said first channel side wall portion and into said channel; and,
a second retention member disposed within said channel adjacent said second channel side wall portion and in laterally-spaced relation to said first retention member, said second retention member extending axially outwardly beyond said base surface of said base wall portion and including:
a fixed end disposed in along said base wall portion;
a free end disposed in longitudinally-spaced relation to said base wall portion relative to said fixed end; and,
a projection extending from along said free end of said second retention member beyond said second channel side wall portion and into said channel;
said first and second retention members capable of resilient deflection such that, in an installed condition, the associated structural member can be received within said channel with the one associated surface in abutting engagement with said base surface of said base wall portion and at least one of said projections of said first and second retention members in abuttingly engagement with the other surface of the associated structural member.

17. A gas spring end member assembly according to claim 16 further comprising:
a first recess wall portion at least partially defining a first recess extending laterally outward from said channel along said first channel side wall portion adjacent said first retention member; and,
a second recess wall portion at least partially defining a second recess extending laterally outward from said channel along said second channel side wall portion adjacent said second retention member.

18. A gas spring end member assembly according to claim 17, wherein said first retention member is at least partially disposed within said first recess such that a first gap is formed between said first retention member and said first recess wall portion, and said second retention member is at least partially disposed within said recess such that a second gap is formed between said second retention member and said second recess wall portion with said first and second gaps dimensioned to permit said free ends of said first and second retention members to laterally deflect in a direction away from one another.

19. A gas spring assembly dimensioned for securement along an associated structural member having associated surfaces facing in opposite directions from one another, said gas spring assembly comprising:
a flexible spring member having a longitudinal axis, said flexible spring member including a flexible wall extending peripherally about said longitudinal axis between opposing first and second spring member ends with a spring chamber at least partially defined therebetween;
an end member secured across said first spring member end such that a substantially fluid-tight seal is formed therebetween; and,
an end member assembly operatively connected to said second spring member end such that a substantially fluid-tight seal is formed therebetween, said end member assembly including:
a base wall portion oriented transverse to said longitudinal axis, said base wall portion extending radially outward to an outer peripheral edge and including a base surface dimensioned to abuttingly engage the associated structural member;
a first channel side wall portion extending in a first longitudinal direction from along said base wall portion to a first distal edge disposed in longitudinally-spaced relation to said base wall portion;
a second channel side wall portion extending in said first longitudinal direction from along said base wall portion to a second distal edge disposed in longitudinally-spaced relation to said base wall portion, said second channel side wall portion disposed in laterally spaced relation to said first channel side wall portion such that a channel dimensioned to receive the associated structural member is at least partially formed between said first and second channel side wall portions, said channel extending lengthwise across said base wall portion in a direction transverse to said longitudinal axis and including:
- a first open end disposed along said outer peripheral edge;
- a second open end disposed along said outer peripheral edge and in laterally-spaced relation to said first open end; and,
- a third open end extending laterally across said gas spring end member between said first and second distal edges of said first and second channel side wall portions; and, a first retention member disposed within said channel adjacent said first channel side wall portion, said first retention member extending axially outwardly beyond said base surface of said base wall portion and including:
- a fixed end disposed in along said base wall portion;
- a free end disposed in longitudinally-spaced relation to said base wall portion relative to said fixed end; and,
- a projection extending from along said free end of said first retention member beyond said first channel side wall portion and into said channel;
- said first retention member capable of resilient deflection such that, in an installed condition, the associated structural member can be received within said channel with one surface of the associated structural member in abutting engagement with said base surface of said base wall portion and said projection of said first retention member in abuttingly engagement with the opposing surface of the associated structural member.

20. A gas spring assembly according to claim 19, wherein said end member assembly includes:

a second retention member disposed within said channel adjacent said second channel side wall portion and in laterally-spaced relation to said first retention member, said second retention member extending axially outwardly beyond said base surface of said base wall portion and including:
- a fixed end disposed in along said base wall portion;
- a free end disposed in longitudinally-spaced relation to said base wall portion relative to said fixed end; and,
- a projection extending from along said free end of said second retention member beyond said second channel side wall portion and into said channel;

said first and second retention members capable of resilient deflection such that, in an installed condition, the associated structural member can be received within said channel with one surface of the associated structure member in abutting engagement with said base surface of said base wall portion and at least one of said projections of said first and second retention members in abuttingly engagement with the other surface of the associated structural member.

* * * * *